G. H. BAISLEY & G. WILSON.
Earth-Augers.
No. 140,756.　　　　　　　　　　　　　　Patented July 15, 1873.
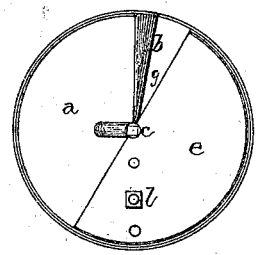
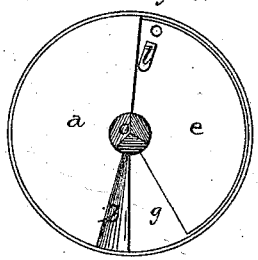
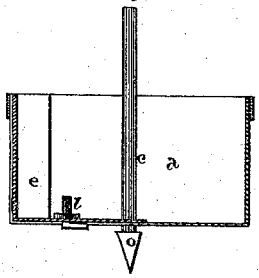
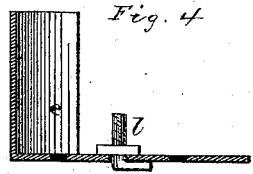
WITNESSES..
INVENTOR

UNITED STATES PATENT OFFICE.

GEORGE H. BAISLEY AND GEORGE WILSON, OF HAMILTON, MISSOURI; SAID BAISLEY ASSIGNOR OF HIS RIGHT TO ISAAC V. SPLAWN.

IMPROVEMENT IN EARTH-AUGERS.

Specification forming part of Letters Patent No. 140,756, dated July 15, 1873; application filed March 7, 1873.

*To all whom it may concern:*

Be it known that we, G. H. BAISLEY and GEO. WILSON, of Hamilton, county of Caldwell and State of Missouri, have invented certain new and useful Improvements in Well-Augers, of which the following is a specification:

The nature of our invention relates to an improvement in well-augers; and it consists in the application of a movable or adjustable stop to the valve, so as to regulate the distance to which it shall open.

Figure 1 shows a plan view of our invention. Fig. 2 is an inverted view of the same. Fig. 3 is a vertical cross-section of the auger. Fig. 4 is an enlarged similar view of the valve and stop alone.

$a$ represents the stationary part of the auger, to which the cutting-lip $b$ is secured. Pivoted to this part, by means of the shaft $c$, is the movable part $e$, which acts as a door or slide to close the opening $g$ while the auger is being elevated with the dirt, and thus prevent any part of it from falling back into the hole again. As the part $e$ is secured to the shaft, the act of turning the shaft, in the direction to make the point enter the earth, moves the part back so as to uncover the opening $g$, and in reversing the shaft to withdraw the auger, the opening is closed again. Through the part $e$ are made several holes, $i$, through which is secured any suitable device, $l$, which, projecting through the bottom, and made to catch against the edge of the part $a$, as shown in Fig. 2, regulates the distance to which the part $e$ shall move, and thereby the size of the opening $g$. By moving the stop in or out, nearer to or further from the center of motion, the size of the hole can be increased or diminished at will. The end of the shaft is provided with the triangular point $o$, which steadies the auger while boring, and which works with less friction, and clears the hole better than any other shaped point would do.

Having thus described our invention, what we claim as new, and desire to secure by Letters Patent, is—

The movable or adjustable stop $l$, in combination with the auger $a$ and valve $e$, when so arranged as to regulate the distance to which the valve shall open, substantially as shown and described.

In testimony that we claim the foregoing as our invention we hereunto affix our signatures this 26th day of February, 1873.

GEORGE H. BAISLEY.
GEO. WILSON.

Witnesses:
B. M. DILLEY,
J. W. McCLELLAND.